United States Patent

Eulenberg et al.

[15] 3,676,733

[45] July 11, 1972

[54] CIRCUIT ARRANGEMENT FOR GENERATING A LINE FREQUENCY PARABOLICALLY MODULATED SAWTOOTH CURRENT OF FIELD FREQUENCY THROUGH A FIELD DEFLECTION COIL

[72] Inventors: Hannspeter Eulenberg, Bauweg, Germany; Gerardus Antonius Wilhelmus Van Veldhoven, Emmasingel, Eindhoven, Netherlands

[73] Assignee: U.S. Philips Corporation, New York, N.Y.

[22] Filed: June 13, 1969

[21] Appl. No.: 832,970

[30] Foreign Application Priority Data

June 22, 1968 Netherlands..........................6808845

[52] U.S. Cl...........................................................315/27 GD
[51] Int. Cl...........................................................H01j 29/70
[58] Field of Search..............................315/27 GD, 27, 27 R

[56] References Cited

UNITED STATES PATENTS

| | | | |
|---|---|---|---|
| 2,344,736 | 3/1944 | Schade | 315/27 UX |
| 3,174,074 | 3/1965 | Massman | 315/27 UX |
| 3,320,469 | 5/1967 | Slavik | 315/27 UX |

FOREIGN PATENTS OR APPLICATIONS

| | | | |
|---|---|---|---|
| 1,068,307 | 5/1967 | Great Britain | 315/27 |

*Primary Examiner*—Carl D. Quarforth
*Assistant Examiner*—J. M. Potenza
*Attorney*—Frank R. Trifari

[57] ABSTRACT

A TV deflection system that includes a circuit for generating a sawtooth field current parabolically modulated at the line frequency in the field deflection coil. The circuit includes a resonant circuit composed of a capacitor and the field deflection coil with a resonant frequency that is approximately one fifth of the line frequency for deriving the parabolic modulation component of line frequency. The sawtooth field deflection generator periodically excites the resonant circuit via a bidirectional electronic switch that is periodically switched in synchronism with the line flyback pulses.

12 Claims, 3 Drawing Figures

INVENTORS
HANNSPETER EULENBERG
GERARDUS A.W. VAN VELDHOVEN
BY
AGENT

INVENTORS.
HANNSPETER EULENBERG
GERARDUS A.W. VAN VELDHOVEN
BY
AGENT

CIRCUIT ARRANGEMENT FOR GENERATING A LINE FREQUENCY PARABOLICALLY MODULATED SAWTOOTH CURRENT OF FIELD FREQUENCY THROUGH A FIELD DEFLECTION COIL

The invention relates to a circuit arrangement for generating a line frequency parabolically modulated sawtooth current of field frequency through a field deflection coil. By means of this current, in cooperation with a sawtooth current of line frequency flowing through a line deflection coil, a field can be scanned line by line on the screen of a cathode ray tube with the aid of an electron beam. A circuit arrangement of this type is provided with a resonant circuit having a resonant frequency which is smaller than the line frequency to obtain the more or less parabolic current component of line frequency, said resonant circuit being periodically excited by means of an electronic switch switching at the line frequency and with the aid of a voltage source.

Such a circuit arrangement is known from British Patent specification 1,068,307 in which especially FIG. 6 shows a circuit arrangement for use with a color television cathode ray tube.

Without the more or less parabolic current component in the field deflection current a distortion in the direction of deflection of the field deflection coil occurs in the raster scanned on the screen of the cathode ray tube One cause of the raster distortion is the slight curvature of the surface of the screen of the cathode ray tube. At a greater angle of deflection and hence a larger distance for the electrons to be covered, the area of impingement of the electron beam on the screen will shown as a function thereof an additional displacement in the direction of deflection. A further cause is the spatial distribution of the magnetic field in the field deflection coil. A similar displacement occurs in the case of deflection with the aid of the line deflection coils so that a raster scanned line by line shows the so-called pincushion distortion, for example, in monochrome or color television. Very strong raster distortion occurs especially in modern television display tubes having wide angles of deflection. For a line deflection in the horizontal direction and hence a field deflection in the vertical direction the so-called vertical (North-South) raster correction of the pincushion distortion may be obtained with the aid of the parabolic current component in the field deflection current whose amplitude is dependent on the instantaneous value of the sawtooth current of field frequency.

In the said known circuit arrangement two resonant circuits are used to perform the North-Sourth raster correction. These resonant circuits are periodically connected through switches to two voltage sources which supply constant D.C. voltages of opposite polarity. The resonant frequency of both resonant circuits is about half the line frequency. Opening the switches at the beginning of a line scan would have the result that cosinusoidally varying voltages of opposite polarity and constant amplitude occur for approximately half a period across the two resonant circuits during the sweep. By superposition of these constant D.C.-voltages of opposite polarity on a sawtooth voltage of field frequency it is achieved that sinusoidally varying currents having increasing or decreasing amplitudes flow in the resonant circuits. The direction of current in one resonant circuit is opposite to that in the other. By taking a primary transformer winding for the inductance of each resonant circuit and by connecting the secondary windings of the transformers in series, the two sinusoidal currents having increasing or decreasing amplitudes are superimposed upon each other. By providing one or more series-arranged field deflection coils parallel to the series-arranged secondary windings of the two transformers, a line-frequency varying sinusoidal current having a varying amplitude flows in the two directions through the deflection coils. This correction current is in turn superposed on a sawtooth deflection current of field frequency since a choke coil in series with a secondary winding of a transformer in the field output stage of a television receiver is connected parallel to the field deflection coils.

There are many drawbacks of the known circuit arrangement. It has been found that two voltage sources having constant voltage values of opposite polarity, two separate switches, two resonant circuits and two transformers forming a part thereof are required for performing the North-South raster correction. The desired correction is only partly achieved because the desired parabolic correction current is approximated at half a period of the sinusoidal current. This approximation only applies about and near the peak amplitude values of the variations in sinusoidal current. Also, the distortions introduced in the circuit arrangement by the frequent superposition and by the numerous inductive components are not to be neglected. The choke coil required to block the correction current has a much larger inductance and a much smaller resistive value than those of the field deflection coils which necessitates a heavy, expensive choke coil construction.

It is an object of the invention to provide a simple, cheap circuit arrangement having few additional components and in which the said drawbacks do not occur for generating, with the aid of a resonant circuit, the line frequency parabolically modulated sawtooth deflection current of field frequency. To this end the circuit arrangement according to the invention is characterized in that the inductance of the resonant circuit is principally formed by the field deflection coil, while the said voltage source associated with the resonant circuit provides the sawtooth voltage of field frequency, the electronic switch being capable of passing current in both directions.

The invention is based on the recognition of the fact that superposition circuits are entirely superfluous for generating the sawtooth field deflection current of field frequency and the substantially parabolic correction current since the overall generation is possible in a single circuit arrangement. For the practical construction thereof the normal known field deflection circuit arrangement only additionally requires: a line frequency switching electronic switch which is capable of passing current in both directions, a coil in series with the switch and a capacitor which together with the field deflection coil forms the resonant circuit. Tuning of the resonant circuit to a resonant frequency which is approximately one fifth of the line frequency has the result that a very satisfactory approximation of the parabola shape is reached because only a small part around the peak amplitude of a sine or cosine function is utilized for the approximation.

In order that the invention may be readily carried into effect a few embodiments thereof will now be described in detail by way of example with reference to the accompanying diagrammatic drawings in which.

Figures 1, 2:
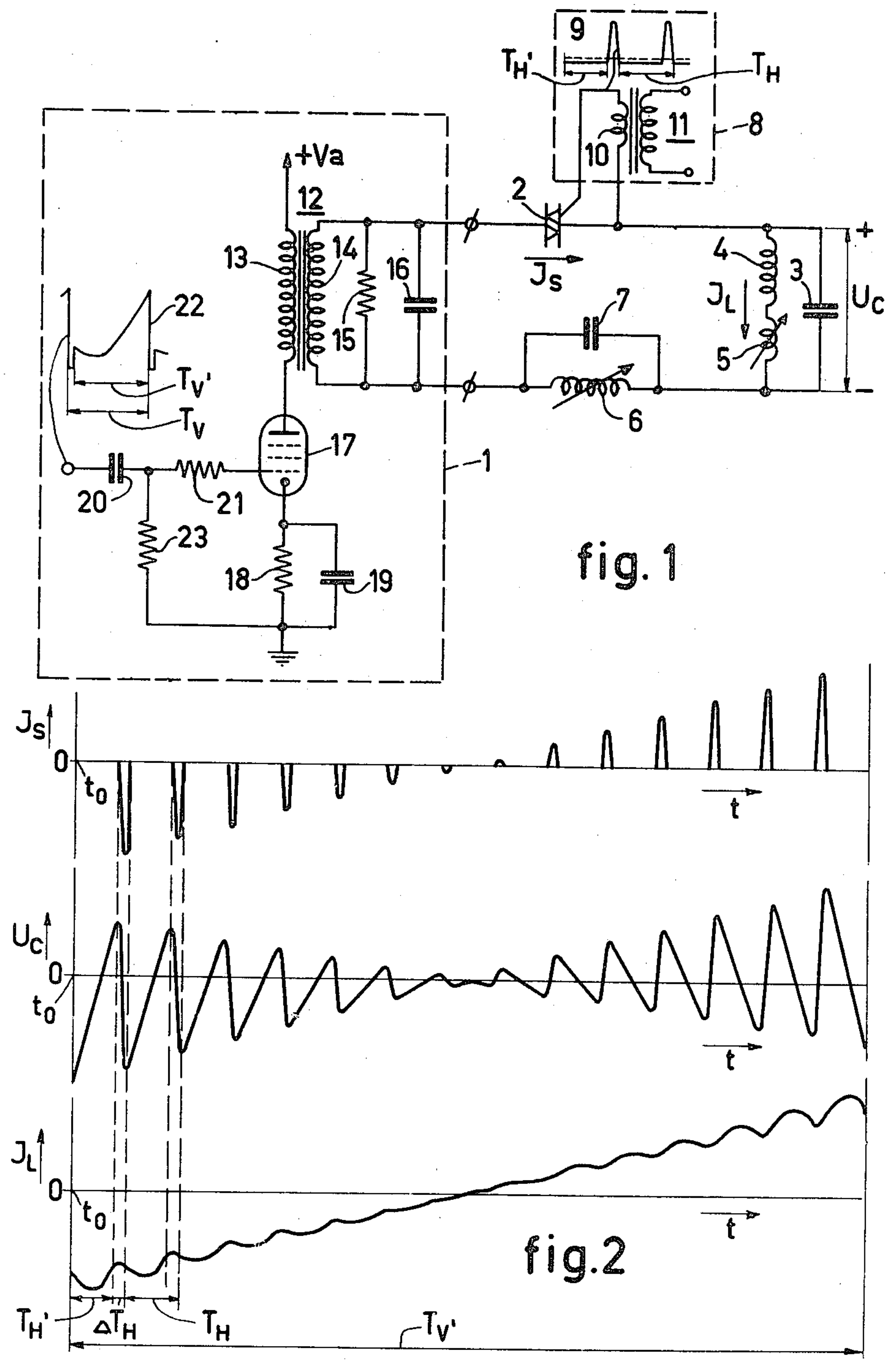
FIG. 1 shows an embodiment of a circuit arrangement according to the invention which is provided with a resonant circuit in parallel arrangement.
FIG. 2 shows a few current and voltage curves as a function of time that are useful in explaining FIG. 1.

FIG. 1 shows a voltage source 1 for generating a sawtooth voltage. Voltage source 1 may form a part of a field output stage of, for example, a monochrome or color television receiver. According to the invention the generated sawtooth voltage of field frequency is applied to a series arrangement which consists of an electronic switch 2, a resonant circuit formed by a parallel arrangement of a capacitor 3 and a field deflection coil 4 in series with a variable coil 5 and a parallel arrangement of a variable coil 6 and a capacitor 7. The components in this series arrangement which are essential for the invention are switch 2, field deflection coil 4 and capacitor 3.

Switch 2 must be able to conduct current in two directions and may comprise an electronic switch made up of transistors, diodes, etc. The embodiment shown in FIG. 1 uses a so-called triac which is built up from two parallel arranged thyristors connected in the opposite current direction which are controlled through one control electrode only. The use of a triac is possible because switching-off will appear to take place at the instant when no current flows through the switch 2. Since a triac switch can only endure a limited specific increase of the recurrent voltage (*du/dt*) after switching off, capacitor 7 is provided, inter alia, to decrease the specific increase.

Switch 2 is switched under the influence of the voltage provided by a voltage source 8. Voltage source 8 may represent the line output stage of a television receiver and applies a pulsatory voltage 9 of line frequency to the control electrode of switch 2 by providing a winding 10 on a line output transformer 11 which is a part of voltage source 8. The pulses in the voltage 9 represent the flyback pulses in the line output transformer 11 which cause switch 2 to conduct current. During the sweep, of the sawtooth current of line frequency, not shown, which sweep corresponds to the time interval $T_H'$ shown, switch 2 is blocked.

The field frequency sawtooth voltage source 1 may include a conventional transformer 12. Transformer 12 is provided with a primary winding 13 and a secondary winding 14 to which a damping resistor 15 and a capacitor 16 are parallel connected. One end of winding 13 is connected to a terminal of a supply source V*a* (not shown) conveying a constant positive voltage +V*a*, the terminal conveying the negative voltage being connected to ground. The other end of winding 13 is connected to ground through a pentode amplifier 17 and a parallel arrangement of a resistor 18 and a capacitor 19 located in the cathode line thereof. A control voltage 22 is applied to the control grid of the pentode amplifier element 17 through an isolation capacitor 20 and a current limiting resistor 21. The junction of capacitor 20 and resistor 21 is connected to ground through a leakage resistor 23.

Control voltage 22 consists of a parabolic and a linearly increasing voltage during the sweep $T_V'$. The pulsatory remaining part of a field period $T_V$ brings and maintains the amplifier element 17 into a cut-off condition. A more or less sawtooth voltage of field frequency will be generated across capacitor 16 under the control of control voltage 22. For a desired variation of the slope in the sweep $T_V'$ of the more or less sawtooth voltage, voltage source 1 may be provided in known manner with negative feedback circuits. The particular construction of the voltage source 1 supplying the sawtooth voltage of field frequency is not essential co the invention and could also include transistors.

The resonant frequency of the resonant circuit whose capacitance is determined by capacitor 3 and whose inductance is mainly determined by the field deflection coil 4 (possibly consisting of a plurality of partial coils) must be made smaller than half the line frequency. In a practical embodiment of the circuit arrangement the resonant frequency is made approximately equal to one fifth of the line frequency. The construction and the impedance of the field deflection coil 4 are determined by the requirements which are imposed on the field deflection of the electron beam in a cathode ray tube. The desired resonant frequency is obtained by the choice of the value of capacitor 3.

The use of coil 6 in the circuit arrangement according to FIG. 1 is not essential for the invention, but coil 6 limits in known manner the amplitude of the current flowing through switch 2 during the line flyback period. For the purpose of causing current to flow in one direction through switch 2 during the entire line flyback period, the resonant frequency of the resonant circuit formed by capacitors 3 and 7 and coils 4, 5 and 6 is adjusted with the aid of the variable coil 6 in such the natural manner that a period thereof is substantially equal to twice the line flyback period. The said tuning provides the advantageous effect that the voltage across the parallel arrangement of capacitor 3 and field deflection coil 4 may rise to much higher values during the line flyback period than the maximum voltage value of voltage source 1.

A few currents and voltages occurring in the circuit arrangement of FIG. 1 and which, according to the invention, are important for the correct operation of the said circuit arrangement are shown diagrammatically in FIG. 2 as a function of time. The current and voltage characteristics are shown during the sweep $T_V'$ of the field frequency sawtooth voltage generated by voltage source 1. The time intervals $T_H$, $T_H'$ and $\Delta T_H$ indicate the line period, the line sweep and the line flyback period, respectively, of the sawtooth deflection current of line frequency occurring in voltage source 8 but not shown. For obtaining simple and clear characteristics a field has been taken which is composed of fifteen lines in which interlacing has been omitted.

In FIG. 2 current waveform $J_S$ shows the current flowing through switch 2 during the line flyback period $\Delta T_H$. Voltage $U_C$ shows the voltage across the capacitor 3 and hence across the series arrangement of field deflection coil 4 and coil 5 in FIG 1. Current $J_L$ is the corrected field deflection current flowing through the field deflection coil 4.

To explain the characteristics of FIG. 2 the starting point is the beginning of the sweep $T_V'$ of the sawtooth voltage of field frequency provided by the voltage source 1. At the instant $t_0$, for example, capacitor 3 conveys a voltage $U_C$ having a negative value and a deflection current $J_L$ of a given value flows through the field deflection coil 4 in a negative direction. Switch 2 opens at the instant $t_0$ so that a free oscillation at the resonant frequency can occur in the resonant circuit including the capacitor 3 and the field deflection coil 4. After one line sweep $T_H'$ switch 2 is closed again whereafter a following cycle starts after the line flyback period $\Delta T_H$.

By choosing the resonant frequency of the resonant circuit to be less than one half of the line frequency (by the choice of the value of capacitor 3), for example, at one fifth part thereof, it is achieved that the voltage $U_C$ across capacitor 3 is substantially linear during the line sweep $T_H'$ and hence the current $J_L$ flowing through coil 4 varies substantially parabolically. Taking into account a line flyback period $\Delta T_H$ of, for example, approximately 20 percent of the line period $T_H$ the resonant circuit will be able to oscillate freely only through approximately 80 percent of the line period $T_H$ which in the given example corresponds to approximately $1/5 \times 0.8$, that is to say, approximately one-sixth part OR 60° of the natural period. The result is that the voltage $U_C$ varying with a phase shift according to a cosine function passes through approximately 30° on either side of a zero-crossing and hence varies substantially linearly. For the current $J_L$ varying with a phase shift according to a sine function the result is that approximately 30° on either side of the peak amplitude are passed so that a substantially parabolic variation occurs. The asymmetry which is greatly apparent in FIG. 2 relative to the said zero-crossing ($U_C$) and amplitude ($J_L$) is the result of the fact that a field consisting of only 15 lines is considered.

Closing the switch 2 after the line sweep $T_H'$ and maintaining switch 2 closed during the line flyback period $\Delta T_H$ has the result that voltage source 1 is connected to the resonant circuit including capacitors 3 and 7 and coils 4, 5 and 6. This resonant circuit has a natural period which is approximately twice the line flyback period $\Delta T_H$. In the resonant circuit, the voltage $U_C$ will thus vary according to half a cosine function and the currents $J_L$ and $J_S$ will vary according to half a sine function. The value of the voltage $U_C$ and the current $J_L$ which is reached at the end of the line flyback period $\Delta T_H$ is determined by the instantaneous value of the voltage supplied by the voltage source 1. The same applies to the amplitude of the current $J_S$ flowing through the switch 2. The result is that this causes a linearly varying voltage from voltage source 1 passing through the zero value and a corresponding variation of the deflection current $J_L$ and of the maximum value of the voltage $U_C$ and the current $J_S$ occurring during one line period.

It is evident that the chosen value of the capacitor 3 determines both the part used of the natural period of the resonant circuit including capacitor 3 and coil 4 and the amplitude of the parabolic current component for a given value of the sawtooth deflection current $J_L$. A simple method for adjusting the parabolic current component can be achieved with the aid of the variable coil 5. An increase of the inductance of coil 5 reduces the amplitude of the parabolic current component and vice versa due to detuning of the resonant circuit. Alternatively the capacitor 3 may of course also be made variable.

The circuit arrangement of FIG. 1 has the advantage that due to switch 2 being opened during the line sweep $T_H'$ the resonant circuit including capacitor 3, field deflection coil 4 and variable coil 5 can freely oscillate during the line deflection period. The influence of parasitic capacitances is then nil since they are incorporated in capacitor 3. As a result the voltage source 1 supplying the sawtooth voltage of field frequency cannot exert a disturbing influence during the line sweep on the line deflection on the screen of the cathode ray tube. Of course, the pulsatory current $J_S$ flowing through switch 2 at the line frequency must follow a short-circuit path in the voltage source 1 to which end the value of the capacitor 16 in the voltage source 1 must be high enough.

Figure 3:
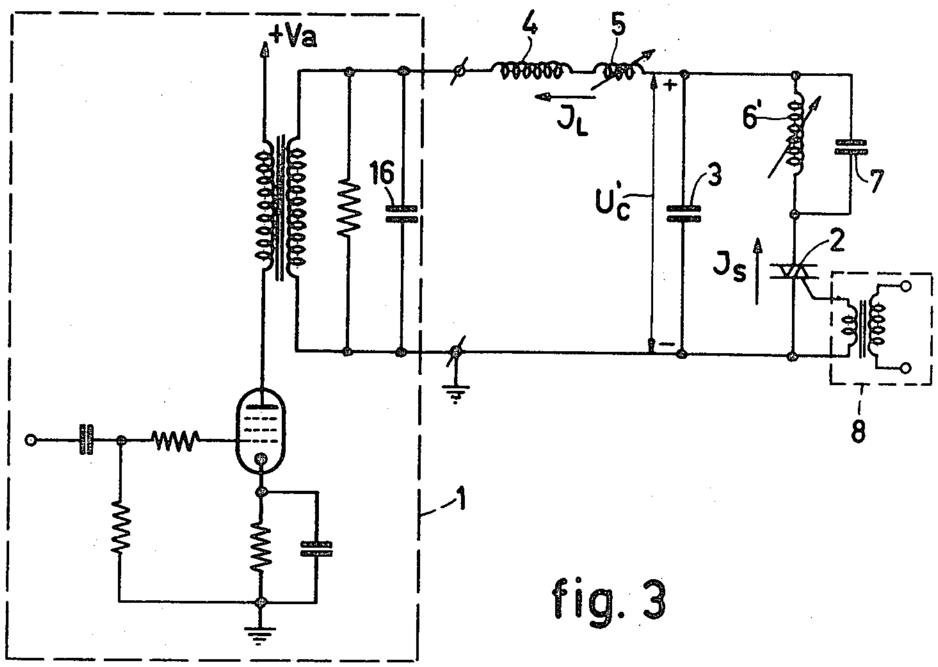
FIG. 3 shows an embodiment of a circuit arrangement according to the invention which is provided with a resonant circuit in series arrangement to which the greater part of the characteristics of FIG. 2 also apply.

The embodiment shown in FIG. 3 of a circuit arrangement according to the invention is provided with a resonant circuit in series arrangement. A few components already having reference numerals for the description of FIG. 1 are indicated by the same reference numerals in so far as they are important.

The voltage source 1 connected to earth and supplying the sawtooth voltage of field frequency is connected to a series arrangement of the field deflection coil 4, the variable coil 5 and the capacitor 3. A variable coil 6' and the parallel capacitor 7 in series with the electronic switch 2 (e.g. a triac are connected parallel to capacitor 3. During the line sweep switch 2 does not conduct and during the line flyback period switch 2 conducts under the control of the voltage source 8 which may represent the line output stage of a television receiver.

During the line sweep the resonant circuit formed by the coils 4 and 5 and capacitor 3 is connected to the voltage source 1. The resonant frequency of this resonant circuit in series arrangement is more than twice as small as the line frequency and may be, for example, approximately one fifth thereof. During the line flyback period switch 2 switches on the resonant circuit which is formed by capacitors 3 and 7 and coil 6'. The period of the resonant frequency of this resonant circuit in parallel arrangement may be approximately twice the line flyback period.

To emphasize a few differences between the circuit arrangement of FIGS. 1 and 3, FIG. 3 uses indices for coil 6' and the voltage $U_C'$ across capacitor 3.

The description of the circuit arrangement shown in FIG. 1 shows that coil 6 is not essential to the invention. In principle coil 6 of FIG. 1 serves mainly to limit the amplitude and to cause the current through switch 2 to flow during substantially the entire line flyback period. In contrast therewith coil 6' in the circuit arrangement according to FIG. 3 is essential to the operation of the circuit arrangement.

To explain the operation of the circuit arrangement according to FIG. 3 use may be made of the characteristics which are shown in FIG. 2. The corrected current $J_L$ flowing through the field deflection coil 4 and shown in FIG. 3 and current $J_S$ flowing through the switch 2 correspond to those shown in FIG. 2. The voltage $U_C'$ across capacitor 3 differs, however, from the voltage $U_C$ shown in FIG. 2 which in fact is applied across the series arrangement of the coils 4 and 5. Voltage $U_C'$ therefore includes the linearly varying voltage which is supplied by the voltage source 1 during the field sweep $T_V'$. In a field being built up of a few hundred lines this voltage can be considered as a more or less constant voltage during one line period. Apart from this more or less constant voltage during one line period the variation of voltage $U_C'$ during one line period is equal to that of voltage $U_C$.

At the instant $t_0$ at the beginning of the sweep $T_V'$ of the sawtooth voltage of field frequency supplied by voltage source 1, for example, capacitor 3 conveys a negative voltage and a deflection current $J_L$ flows in the negative direction through the field deflection coil 4 under the influence of a positive voltage at the terminal of voltage source 1 connected to coil 4. Switch 2 opens at the instant $t_0$ so that capacitor 3 is discharged by the deflection current $J_L$ flowing through the coils 4 and 5 and is subsequently charged in the opposite sense. In the manner as already described in FIGS. 1 and 2 the low resonant frequency of the resonant circuit including capacitor 3 and coils 4 and 5 results in the discharging and recharging taking place substantially linearly. Accordingly the deflection current $J_L$ has a substantially parabolic variation.

At the end of the line sweep $T_H'$ switch 2 is closed for the duration of the line flyback period $\Delta T_H$. The resonant circuit which includes capacitor 3 and the coil 6' in parallel arrangement is therefore excited. The high resonant frequency of this resonant circuit adjusted with the aid of the variable coil 6' has the result that the voltage across capacitor 3 during the line flyback period $\Delta T_H$ varies in accordance with approximately half a cosine function and the current $J_S$ varies in accordance with approximately half a sine function. The deflection current $J_L$ therefore also varies in accordance with half a sine function. The voltage across capacitor 3 thus obtains a negative voltage at the end of the line flyback period $\Delta T_H$ so that a new cycle can start at the beginning of the next line period $T_H$.

For obtaining the substantially parabolic current component in the sawtooth current $J_L$ of field frequency it is required that the voltage across capacitor 3 reverses its polarity during the line flyback period. This reversal of polarity should be effected with the aid of a resonant circuit so that it is not sufficient to only connect switch 2 parallel to capacitor 3. It appears that coil 6' is essential for a satisfactory operation of the circuit arrangement shown in FIG. 3.

The circuit arrangement of FIG. 3 has the advantage that the pulsatory current $J_S$ occurring at line frequency and flowing through switch 2 does not flow through the voltage source 1 supplying the sawtooth voltage of field frequency so that current $J_S$ cannot exert any influence on source 1. As a result capacitor 16 in voltage source 1 shown in FIG. 3 may be proportioned to be smaller than that in FIG. 1.

In a practical embodiment of the circuit arrangement according to FIG. 1 a few components have the following values:

| | |
|---|---|
| field deflection coil 4 | = 22 mH, 15 Ω |
| capacitor 3 | = 0.1 μF |
| variable coil 5 | = 0–2 mH |
| variable coil 6 | ≈ 130 μH |
| capacitor 7 | = 10 nF |
| capacitor 16 | = 0.5 μF |
| voltage source 1 | = 25 V peak-to-peak value. |

A practical embodiment of the circuit arrangement according to FIG. 3 differs from that of FIG. 1 because capacitor 16 = 0.1 μF.

What is claimed is:

1. In a cathode ray tube deflection system having a line deflection coil and a field deflection coil for scanning an electron beam across the screen of the CRT line by line, the improvement comprising a circuit arrangement for generating a sawtooth current of field-frequency in the field deflection coil which current is parabolically modulated at the line frequency, the circuit arrangement comprising a resonant circuit having a capacitor and an inductance means composed mainly of the field deflection coil, said resonant circuit having a resonant frequency which is lower than the line frequency so as to derive said parabolic modulation current component of line frequency, a bidirectional electronic switch capable of conduction in both directions, a source of sawtooth voltage at the field deflection frequency, means connecting said electronic switch in circuit with said voltage source and said resonant circuit, and means for periodically switching said electronic switch at the line frequency so that said resonant circuit is periodically excited from said voltage source through the electronic switch switching at the line frequency.

2. A circuit arrangement as claimed in claim 1, wherein the resonant frequency of said resonant circuit is approximately one fifth of the line frequency.

3. A circuit arrangement as claimed in claim 1 wherein the sawtooth voltage source of field frequency is connected to the resonant circuit through the switch which is closed during the flyback period of the sawtooth line deflection voltage said resonant circuit including said capacitor and the field deflection coil connected in parallel arrangement to form a parallel resonant circuit.

4. A circuit arrangement as claimed in claim 1 wherein the sawtooth voltage source of field frequency is connected to the resonant circuit which includes the field deflection coil and the capacitor connected in series to form a series resonant circuit, a further coil, and means connecting the series arrangement of the bidirectional switch which is closed during the line flyback period and said further coil in parallel with said capacitor.

5. A circuit arrangement as claimed in claim 4 wherein the parallel arrangement of said capacitor and the bidirectional switch in series with the further coil forms a second resonant circuit with a natural period that is approximately twice the line flyback period.

6. A circuit arrangement as claimed in claim 1 further comprising a variable coil connected in series with the field deflection coil for adjusting the amplitude of the parabolic current component.

7. A circuit arrangement as claimed in claim 2 wherein the switch comprises a triac controlled by line flyback pulses.

8. A circuit arrangement as claimed in claim 1 further comprising a second capacitor and a second inductance means connected in circuit with said capacitor and the field deflection coil to form therewith a second resonant circuit having a natural period that is approximately twice the line flyback period.

9. In a cathode ray tube deflection system having a line deflection coil and a field deflection coil for scanning an electron beam across the screen of the cathode ray tube, the improvement comprising, a sawtooth voltage source of the field deflection frequency, a bidirectional current switch, a capacitor, means connecting said capacitor and said field deflection coil together to form a resonant circuit having a resonant frequency that is lower than the line deflection frequency of the deflection system, means connecting said switch and said resonant circuit to the terminals of said sawtooth voltage source, and means for switching said switch at the line frequency to excite the resonant circuit from said voltage source via the switch in a manner such that the sawtooth field deflection current in said field coil is parabolically modulated at the line frequency.

10. A system as claimed in claim 9 wherein said capacitor and field coil are connected together to form a parallel resonant circuit and said connecting means connects said switch and said parallel resonant circuit in series circuit across the terminals of said sawtooth voltage source.

11. A system as claimed in claim 9 wherein said capacitor and field coil are connected in series across the terminals of said sawtooth voltage source to form a series resonant circuit, a second coil, and wherein said connecting means connects said second coil in series with said switch across the capacitor.

12. A system as claimed in claim 9 wherein said switch comprises a semiconductor device with a control electrode coupled to the horizontal deflection system so as to be triggered into conduction by the line flyback pulses.

* * * * *